United States Patent [19]
Brown et al.

[11] Patent Number: 5,229,899
[45] Date of Patent: Jul. 20, 1993

[54] APPARATUS AND METHOD FOR CONTROLLING VAPOR PHASE WITHIN AN ENCLOSURE

[75] Inventors: Charles A. Brown, San Jose, Calif.; Thomas A. Gregory; Christopher G. Keller, both of Rochester, Minn.; Herman R. Wendt, San Jose, Calif.; Arthur R. Zingher, White Plains, N.Y.

[73] Assignee: International Business Machines Corporation, Armonk, N.Y.

[21] Appl. No.: 884,262

[22] Filed: May 8, 1992

Related U.S. Application Data

[63] Continuation of Ser. No. 535,269, May 24, 1990, abandoned.

[51] Int. Cl.$^5$ .............................................. G11B 33/14
[52] U.S. Cl. ............................... 360/97.02; 360/97.03
[58] Field of Search ......................... 360/97.03, 97.02; 55/387

[56] References Cited

U.S. PATENT DOCUMENTS 4,789,913  12/1988  Gregory ........................... 360/97.03

FOREIGN PATENT DOCUMENTS 0127444  5/1984  European Pat. Off. .

OTHER PUBLICATIONS

Patent Abstracts of Japan—Publication No. 59218633 Entitled "Formation of Lubricating Film on Magnetic Disk Surface".
Patent Abstracts of Japan—Publication No. 62184685 Entitled "Magnetic Disc Device".
Patent Abstracts of Japan—Publication No. 01236423 Entitled "Magnetic Recording Medium".
Patent Abstracts of Japan—Publication No. 02199691 Entitled "Magnetic Disk Device".
Patent Abstracts of Japan—Publication No. 61148691 Entitled "Magnetic Disk Device".

Primary Examiner—A. J. Heinz
Attorney, Agent, or Firm—Roy W. Truelson; Richard E. Billion; Robert W. Lahtinen

[57] ABSTRACT

The vapor drain is a device that permits steady state control of the composition of the atmosphere within a substantially sealed enclosure. For any fabricated enclosure the will be sources of vapor phase molecules: molecules evaporating from a deliberately installed lubricant reservoir, molecules outgassed from components, and molecules diffusing in from the outside world. The purpose of the vapor drain is to minimize the second two classes of molecules in the composition of the enclosure atmosphere as they are considered to be contaminants. An example application is a rigid disk magnetic data storage device which requires a monomolecular layer of lubricant on the disk and slider surfaces. The vapor drains suppresses the contaminant population by capturing a portion of all three sources of molecules in the vapor phase. The vapor drain is a filter which has an active element of at least one of activated carbon, silica gel, activated alumina, synthetic zeolite, and other material with a large surface to volume ratio with the ability to adsorb vapor components from the atmosphere.

16 Claims, 10 Drawing Sheets

APPARATUS AND METHOD FOR CONTROLLING VAPOR PHASE WITHIN AN ENCLOSURE

This application is a continuation of 07/535,269, filed May 24, 1990, now abandoned.

FIELD OF THE INVENTION

This invention concerns the control of the vapor phase composition within an enclosure, such as a rigid disk magnetic data storage device. The method makes it possible to establish a steady state composition of molecular species in the enclosure atmosphere which is very low in undesired contaminant molecules. The purpose of this is to greatly suppress the population of contaminant molecules adsorbed onto the surfaces that have been treated with a preferred molecular species.

BACKGROUND OF THE INVENTION

A critical feature of rigid disk magnetic storage devices is the vulnerability to failure by the slider wearing into the magnetic layer on the disk surface. Magnetic performance improvements have been achieved by using thinner magnetic coatings (less than 100 nanometers thick), and lower flying heights (less than 10 microinches). Both of these factors mean that the tribology of the system must be excellent if a useful life is to be achieved. A thin film of lubricant molecules is required as part of the tribological system to keep the coefficient of friction low when the slider lands on the disk, or intermittently hits it while flying.

In the case of earlier magnetic disk data storage devices, the magnetic medium was a magnetic ink that had significant thickness and porosity. A relatively large amount of lubricant could be accommodated by such a disk, so it was not as sensitive to monolayer quantities of adsorbed contaminants as present disks are. Present disks have an overcoat that is only 20 to 50 nanometers thick, and has very little porosity for storing lubricant. In fact, the disk lubricant is typically only one to several monomolecular layers thick. For a given disk design the lubricant thickness must be held to very close tolerances. If the lubricant gets too thin, the coefficient of friction goes up and wear-out occurs sooner. If the lubricant is too thick, the slider will become stuck to the disk in a process called stiction which can be strong enough to prevent the motor from starting up.

Several lubrication strategies are in use today. A lubricant film may be chemically bonded to the disk surface, and a mobile lubricant film may or may not be added on top of it. A mobile film may be used alone through a one-time application of lubricant at time of manufacture. Or, as taught in U.S. Pat. No. 4,789,913 an equilibrium film thickness is maintained on the disk surface by replenishment through the vapor phase from a reservoir of lubricant within the device enclosure.

Once a strategy has been selected for maintaining the correct thickness, it then becomes important to maintain the correct composition of the film. Contaminant molecules in the vapor phase will become incorporated into the lubricant film. It is unlikely that these compounds will improve the lubrication process, and depending on their chemical structure, they may even destroy it. This has occurred on a number of occasions, resulting in the elimination of certain types of chemicals from the components that go into the device because they cause either wear-out or stiction even when present in only trace amounts in the lubricant film.

The invention disclosed herein is designed to control this problem of lubricant film contamination from the vapor phase.

The key variable to be controlled for each molecular species present in the atmosphere of the enclosure is its relative vapor density. The relative vapor density of any given compound at a given temperature is defined as the ratio of the mass of the compound present per unit volume of air to the mass of the compound that is present in a unit volume of air that is saturated with the compound at that temperature. This is analogous to the special case of water for which this variable is called relative humidity. It is important because the extent to which a molecular species infiltrates the lubricant film is a function of its relative vapor density at the disk surface.

Typically, disk enclosures today are made to be substantially sealed, so the rate at which molecules evaporate from the components such as greases and plastics is greater than the rate at which they leak out of the enclosure. Therefore many of these compounds can be expected to have high relative vapor densities at the disks. In other words, the air is nearly saturated with them.

In the case of U.S. Pat. No. 4,789,913 the relative vapor density of the lubricant in the atmosphere is controlled by the temperature difference between the lubricant reservoir and the disk surfaces. The relative vapor density is deliberately maintained at 0.5 to 0.8 at the disks by the fact that the reservoir is positioned at a location that is 1 to 5 degrees Celsius cooler than the disks during operation. If the temperature difference is allowed to become too small, then the relative vapor density of the lubricant at the disks will get too close to one and the lubricant film will get too thick. If the reservoir gets too cold relative to the disks, then the lube film will get too thin. The spinning of the disks moves the air through the reservoir structure. The reservoir is designed to ensure that the air leaving it is saturated (relative vapor density=1) at the reservoir temperature.

A typical file contains many parts that inadvertently act as reservoirs. Plasticizers from plastic parts, volatile components from greases, and contaminants such as fingerprints, are major sources. Many of these are in locations that are as warm as the disks, so depending on the rate at which they outgas, and the efficiency with which the airflow carries the molecules to the disks, a high relative vapor density may be established at the disks. This will lead to increased contamination of the lubricant film.

There have been recent proposals for even higher density memories designated SXM and based on a STM (Scanning Tunneling Microscope) or other techniques with a head moving extremely close to an extremely smooth memory surface. These offer data density approaching atomic density. These SXM memories will have even greater vulnerability to vapors causing adhesion. Also contamination vapors will cause surface contamination which will obscure atoms of data. Thus these new memories will require even more control of adhesion and vapors compared to thin film magnetic disk memories.

SUMMARY OF THE INVENTION

Magnetic disk files, especially drives with thin film disks, are sensitive to molecules in the vapor phase that adsorb onto the disk and slider surfaces. The present invention is a vapor drain, which is a controlled vapor loss process, such as an activated carbon adsorber or a leak to the outside. The loss rate is controlled by the design of the convection, diffusion or vapor transport aerodynamics. The cumulative loss is controlled by limiting the amount of adsorber or the duration of the leak. The vapor drain can be designed to accomplish the following functions: trap outgassed contamination, reduce or control lube relative vapor density in an operating file, reduce or control lube vapor partial pressure in a dormant file and sample the vapor for chemical extraction and analysis.

Thin film magnetic disk files are sensitive to interior vapors. These can cause thin deposits and 'stiction' failure when the file tries to start, the head and disk stick together so that the motor cannot turn. One example is stiction failure caused by outgassed organic contamination emitted by file components. Another example is stiction failure caused by excessive relative vapor density of lubricant in a file with a vapor lubricant reservoir.

Vapor drain is a deliberate controlled loss mechanism to remove some vapor components from the file atmosphere. This removal may use adsorption, absorption, outward leakage or other processes. A file typically has components which steadily emit contamination vapors. A vapor drain will steadily remove these contamination vapors. Non-equilibrium dynamics will determine the density of contamination vapor in the file atmosphere, and in some cases it will reach a steady state. A suitable vapor drain will make this contamination vapor density much smaller than the contamination density without a vapor drain. Depending on the contamination source and its ability to treat the air, this can readily reduce contamination density by more than a factor of 10. Drain rate is typically controlled by convection aerodynamics. Thus typically vapor loss counterbalances vapor gain, causing a steady state with reduced vapor density. Cumulative drain amount is typically controlled by the adsorber mass or leak duration. A vapor drain can trap outgassed contamination, control relative density of lubricant vapor, sample vapor for chemical analysis.

Some files replenish the lubricant by vapor transport from a lubricant reservoir. In this case, a vapor drain will steadily remove the lubricant molecules from the air as well as contamination. Non-equilibrium dynamics will determine the density of lubricant vapor in the file atmosphere, and if the disk drive runs long enough under constant conditions it will reach a steady state. A suitable vapor drain will make this lubricant relative vapor density significantly smaller than the relative vapor density in air saturated with the lubricant. For example, this can readily produce 50% of saturation density.

Some files have both contamination vapors and lubrication vapors. Depending on various rates, in some cases a vapor drain can greatly reduce the concentration of outgassed vapors, and simultaneously only moderately reduce the concentration of lubricant vapors.

During the early life of the file, more outgassing of materials can be expected to occur until the materials of the parts within the head-disk enclosure become more nearly stabilized. Therefore the structure of the vapor drain should also accommodate the requirement for a variable rate of entrapment or diffusion over the life of the disk drive. This is independent of the lubrication system, which may use vapor replenishment or use a bonded lubricant.

In addition, a vapor drain adsorber accumulates a chemical sample of the vapors in the atmosphere of the head-disk enclosure. Subsequently this sample can be chemically analyzed. As will be shown, this can be accomplished without exposing the head-disk enclosure to the introduction of unfiltered air.

Figure 9:
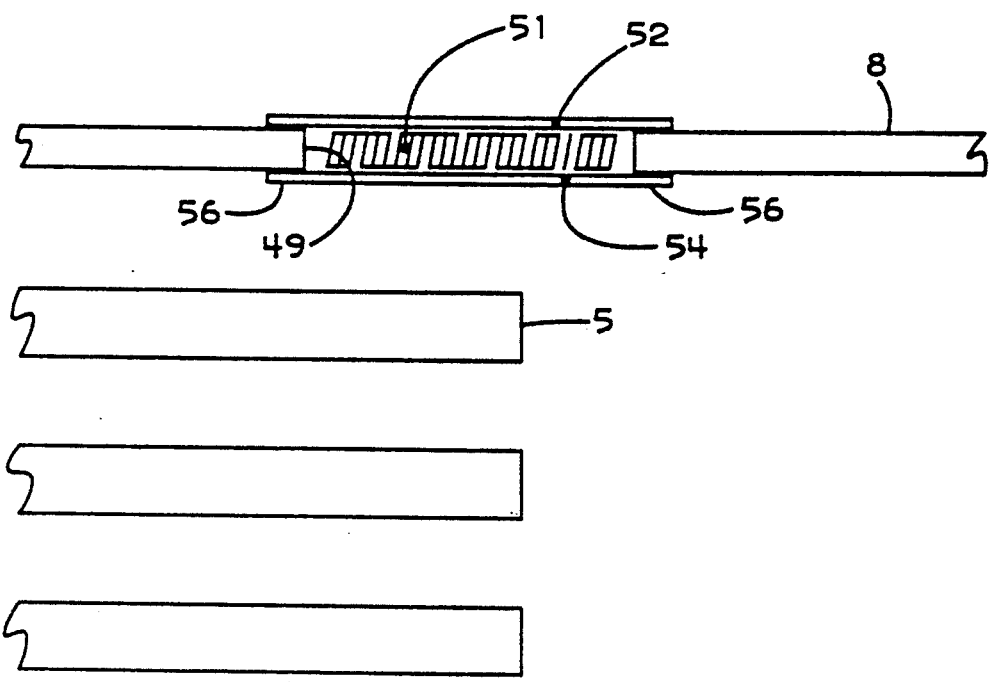

The vapor drain of FIG. 9 is a flow by device mounted in an opening in a disk cover mounting and retained between mylar tape and a particulate filter media enabling removal of the vapor entrapping media without exposing the enclosure to unfiltered air.

Figure 10:
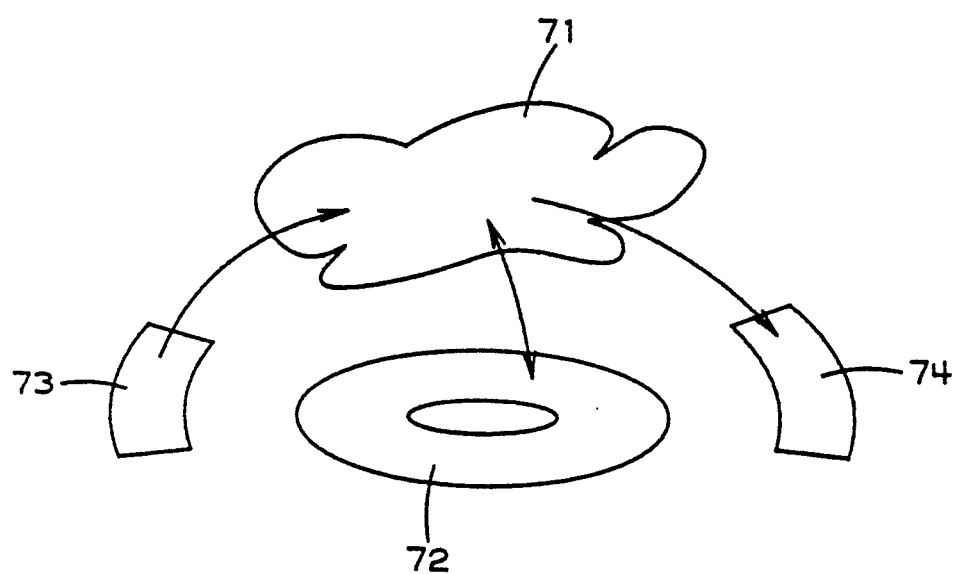

FIG. 10 schematically illustrates vapor transport in a file with a vapor drain.

Figure 11:
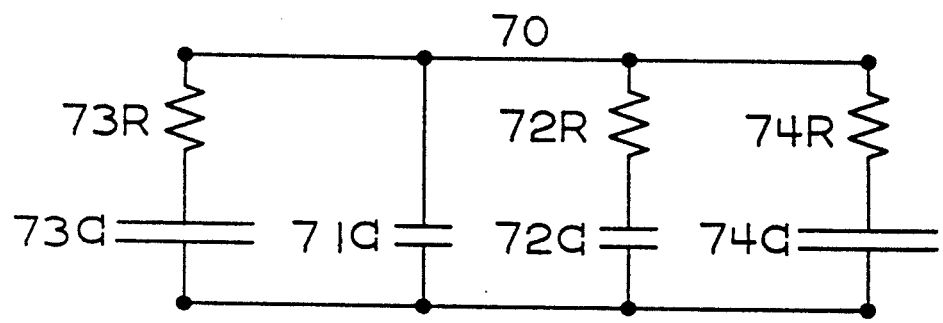

FIG. 11 is an electrical analog to describe the dynamics of vapor transport in a file with a vapor drain.

Figure 12:
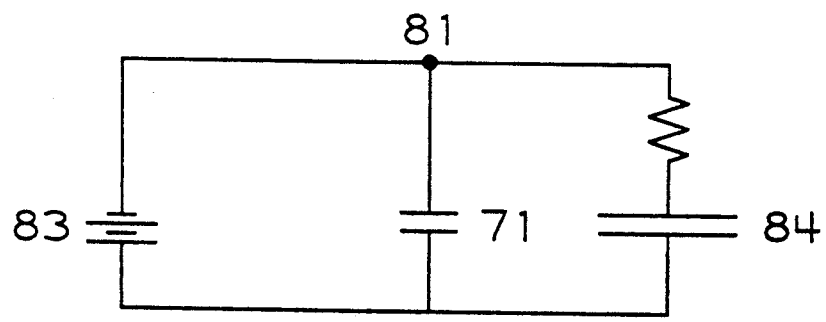

FIG. 12 is an electrical analog to describe another variation of the vapor drain concept.

DETAILED DESCRIPTION

Figure 1:
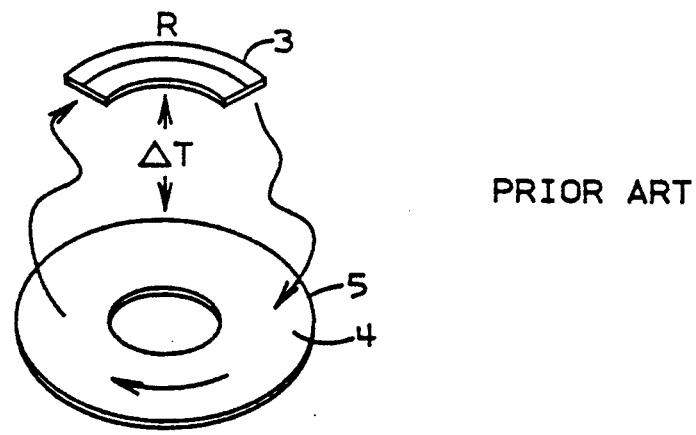
FIG. 1 is a schematic showing of the prior art equilibrium type vapor transport lubrication system.

The prior art, as taught in U.S. Pat. No. 4,789,913, shows an equilibrium lubricant transfer system that provides a replenishable mono-molecular layer of lubricant on the disk surfaces of a magnetic disk file. The system provides a reliable and renewable lubricant film; however, it is dependent upon maintaining the vapor reservoir at a slightly lower temperature than the disks. If the reservoir were to become warmer than the disks, rapid transport of lubricant to the disk surface would occur, which would impair file operation. The environment must provide an ambient atmosphere that enables the reservoir to be maintained at a temperature slightly below the disk temperature. This limits the application of a disk drive using this lubricant system by invoking an additional requirement for the successful application of the device. The equilibrium system is illustrated schematically in FIG. 1 where a reservoir 3 has a saturated atmosphere emerging from the outlet that releases molecules at the surface 4 of disk 5 to maintain a mono molecular layer of lubricant at the disk surface. In practice, these components are confined within an enclosure such that the saturated air from the reservoir is less than saturated at the temperature of the disks.

Lubricant molecules also migrate from the disk surface 4 to the reservoir 3 as an air flow is induced by rotation of the disk 5. The maintenance of the correct film thickness of the lubricant is dependent on the existence of a "delta T", or a lower temperature, at the reservoir than at the rotating disks 5. Since there is no vehicle for the removal of contaminant vapors from the enclosure, the outgassing and other contaminants migrate to the reservoir and the disk surface and gradually accumulate in the reservoir until contaminants begin to reach the atmosphere coming from the reservoir outlet as well as from the sources of contamination.

Figure 2:
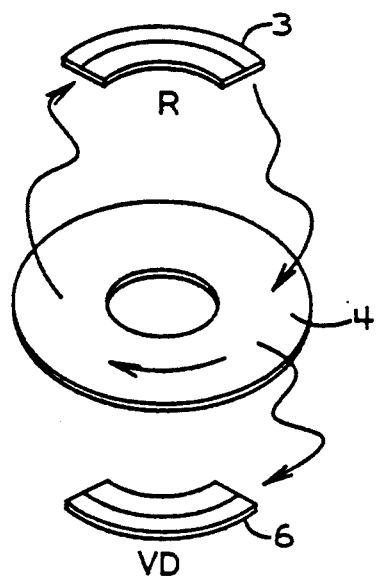
FIG. 2 is a schematic illustration of the steady state vapor transport lubrication system of the present invention.

In the steady state system of the present invention, the reservoir delivers atmosphere that is effectively saturated with lubricant and is admixed with atmosphere passed through a chemical filter that captures substantially all vapors to provide a composite atmosphere with a lube relative vapor pressure that is stabilized at a relative pressure to maintain a partial molecular layer on the disk surface. FIG. 2 schematically illustrates the steady state vapor transport lubrication system wherein there is not only a reservoir 3 and disk surface 4, but also a vapor drain 6. Once again air passing through reservoir 3 emerges saturated with lube from within the reservoir. However, the vapor drain, which is a chemical filter that traps vapors and has an air flow which emerges with an organic vapor pressure that is substantially zero. The composite atmosphere supplied from the reservoir 3 and the vapor drain 6 is less than saturated and the system is not therefore dependent upon maintenance of a reduced temperature at the reservoir. The vapor drain essentially permanently entraps vapors in the air passing therethrough. Contaminant vapors as well as lubricant vapors are trapped. This gradually depletes the lubricant, but it also maintains the atmosphere and the disk surface almost contaminant free. It is also important that the lubricant supply in the reservoir not be depleted during the life of the disk drive. The reservoir capacity and the capability of the vapor drain to capture vapors are selected to achieve this result.

FIG. 10 is a schematic concerning vapors inside a disk file. This shows a density of vapor in the file atmosphere 71, a disk 72, a file component 73 and a vapor drain 74. Into the atmosphere 71, the component 73 supplies vapor density. The surface of the disk 72 develops a coating whose thickness depends on the relative vapor density in the file atmosphere 71 at the disk surface. From the atmosphere 71, a significant part of the vapor density is steadily removed by the vapor drain 74.

The density of vapor is determined by competition between vapor gained from component 73 versus vapor removal by the vapor drain 74. The vapor drain 74 reduces the density of vapors in the file atmosphere 71. The general structure and mechanism of FIG. 10 can be applied to control contamination vapors or to control lubricant vapors. For example, a typical seal band 73A outgasses silicone oil vapor. Thus the vapor drain 74 reduces the density of contamination vapor in the file atmosphere 71. In another example, the file uses vapor replenishment of the lubrication. The component 73B is a lubricant reservoir which emits a lubricant vapor. Thus the vapor drain 74 reduces the density of the lubricant vapor in the file atmosphere 71.

In many cases, after the file has operated long enough at constant conditions, the density of vapor reaches a steady state. This is a dynamic balance between the rate that the component 73 supplies vapor density, and the rate that the vapor drain 74 removes vapor density. At steady state, the relative vapor density is determined mainly by the aerodynamics, convection and diffusion. Also the relative vapor density is largely independent of chemical equilibrium parameters such as file temperature.

These vapor dynamics may be understood by an electronic analogy FIG. 11. Here vapor is represented by electric charge, and vapor density is represented by voltage. The large capacitor 73C and resistor 73R represent the vapor source component 73 and its ability to add vapor to the air. The large capacitor 74C and resistor 74R represent the vapor drain 74 and its ability to remove vapor from the air. The wire 70 represents air motion inside the file spreading the vapor density throughout the file. The small capacitor 72C and resistor 72R represent the deposition of vapor on the disk 72. The small capacitor 71C represents the ability of the file atmosphere to hold vapor.

This analogy implicitly describes many features of the dynamics. The steady state is particularly simple. In some cases, the time constants are hours for the disk 72RC, many years for the component vapor source 73RC, many years for the vapor drain 74RC.

If the file operates for an intermediate duration, then a steady state will occur. Compared to the source voltage at 72C, the voltage in the file atmosphere 70 will be determined by a voltage divider formed by the ratio between source resistor 73R and the drain resistor 74R. Thus the relative vapor density is determined by the ratio between vapor source and drain rates. This depends on aerodynamics, convection and diffusion, and is largely independent of temperature and other thermochemical parameters.

These principals can be applied to lubricant vapor supplied by a lubricant reservoir 73B, and removed by a vapor drain 74. Typically the goal to achieve 50% to 80% relative density of lubricant vapor (compared to the saturation density at the disk temperature). Therefore the vapor drain 74 should match the lubricant reservoir 73B. (A more detailed statement is given below.) This provides a controlled relative vapor density which is largely independent of temperature gradient or overall temperature. This contrasts with U.S. Pat. No. 4,789,913, that teaches a vapor replenishment system which depends on a temperature gradient to control the relative vapor density of lubricant.

Some files have both significant outgassed contamination and vapor lubrication. It is desirable to greatly reduce the outgassed contamination, and to simultaneously achieve 50% to 80% relative density of lubrication vapor. To achieve this requires some parameterization. For a vapor source, parameterize its rate as the equivalent volume per unit time of saturated vapor added to a file atmosphere with initially zero vapor density. For a vapor drain, parameterize its rate as the equivalent volume per time of saturated vapor drained from a file atmosphere with initially saturated vapor density. In some cases, these rates equal the rate that air flows through the vapor source or vapor drain. (Implicitly, these parameterizations might depend on the vapor material. In many cases, these equivalent rates are dominated by convection aerodynamics. For various vapor materials, this depends on the vapor diffusivity, hence on the molecular weight of the vapor. Thus if outgassed contamination and lubricant have similar molecular weights, then the equivalent rate is independent of the vapor material.) With this parameterization, the file can be designed as follows. First design file materials and components which achieve the following: the outgas gain rate is much smaller than the lubricant supply rate from the reservoir. Second, add a vapor drain whose equivalent drain rate for outgassed vapor (measured in a file atmosphere saturated with outgassed contamination) approximates the equivalent gain rate for the lubricant reservoir (measured in a file atmosphere with zero lubricant vapor). At steady state, this vapor drain will moderately reduce the relative density of lubricant vapor, and simultaneously will reduce the outgas relative vapor density by a much larger factor.

In some cases, the vapor source becomes depleted. This can be expressed as a medium-sized capacitor 73C, so the time constant 73RC is a few months. Also a vapor drain with a medium-sized adsorber 74C in a few months time constant 74RC will remove vapor more intensely at first, then less intensely after a few months. More generally, the schematic FIG. 11 implicitly summarizes many additional transient effects. More complex effects can be expressed by using batteries or electrolytic capacitors instead of linear capacitors.

The vapor drain chemical filter element requires high surface area adsorption. Activated carbon is a high capacity non-specific adsorber with a capacity that can be fairly accurately predicted from certain parameters of the carbon and the molar volume of the condensed vapor. As such it is usually the material of choice; however, silica gel, activated alumina and certain synthetic zeolites can be similarly used.

For these materials, the distinction between absorption and adsorption is not always clear. Also one could use materials wherein said vapor chemically combined with the filter material. In the claims which follow let "absorber" or "absorption" implicitly include absorption, adsorption, or chemical reaction.

Another function for a vapor drain is to accumulate a sample of vapors for subsequent chemical testing. This favors a reversible absorber. First operate the file for some time with a reversible absorber. Later remove the absorber. In a laboratory, this can be heated to recover the sample for chemical testing. An alternative is to use a solvent to extract the sample. Below we describe structures to facilitate this chemical testing function.

This chemical testing function can be used various ways. It can be implemented in developmental prototype files to accelerate chemical integration. It can be implemented in a few production files for statistical quality control measure. It can be implemented in many production files, to allow monitoring chemical quality in the field throughout file life.

Another modification is to design the vapor drain to have a greater initial capacity followed by a diminished adsorption capability. During the early life of the file the outgassing contamination and other contaminant sources are more prolific, whereas following the initial period of operation the generation of contaminants stabilizes at significantly lower levels. This bilevel capability can be achieved by limiting the filtering capacity of the filter such that the initial capacity is significant while the later more restricted capacity supplies a longer term lower filtering capability that generally parallels the rate of contaminant generation.

This time dependence can be readily understood by the electronic analogy FIG. 12. Insofar as the component 73/battery 83 becomes significantly discharged, and approaches the vapor density 71/node voltage 81, then it will supply less vapor/current. Likewise as the vapor drain 74/capacitor 84 becomes significantly charged and approaches the vapor density 71/node voltage 81, then it will remove less vapor density/current. The time dependence of the vapor drain can be tailored by using several sub-vapor drains with various time constants. This is analogous to connecting in parallel several RC sub-units with various time constants.

Figure 3:
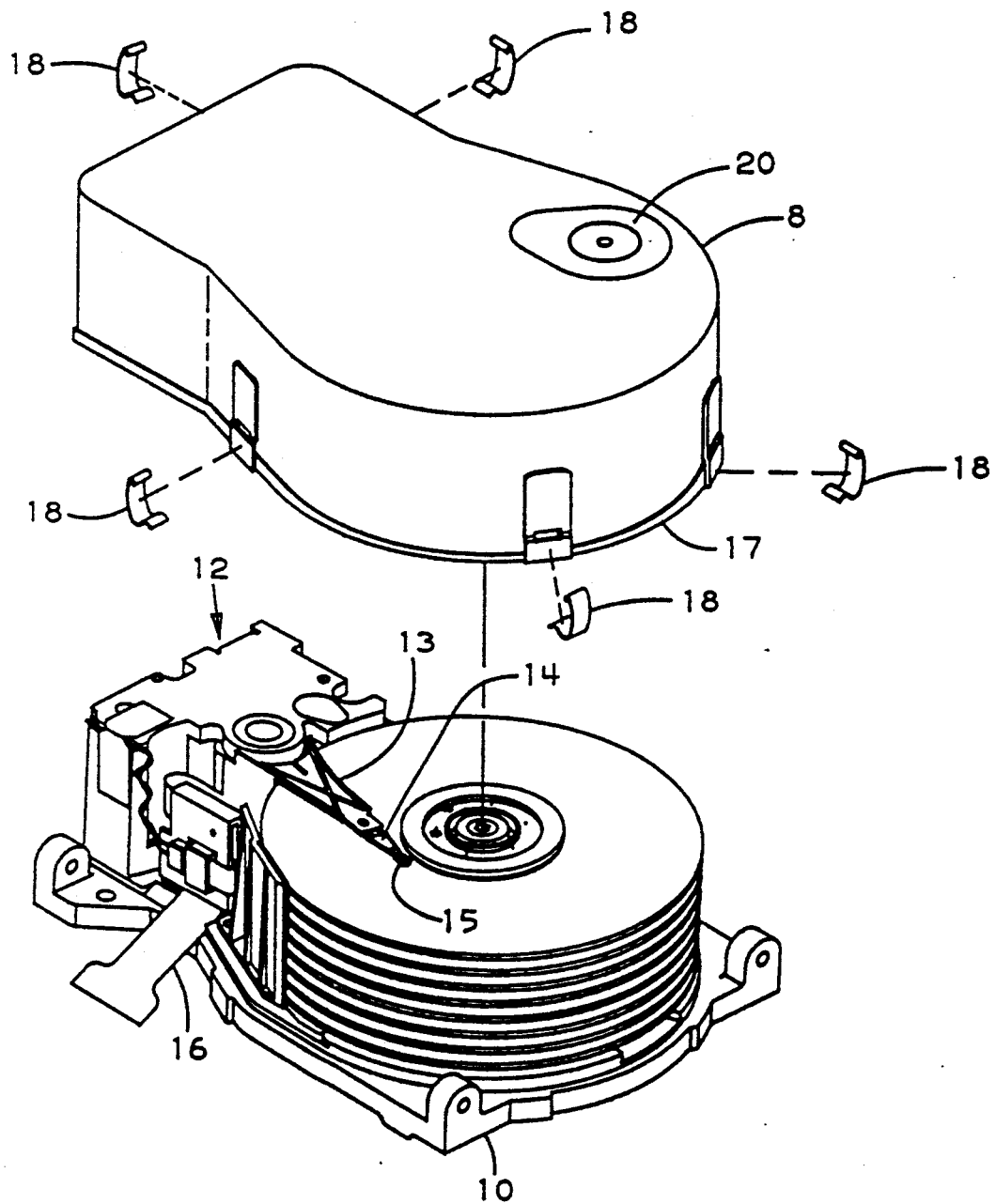
FIG. 3 is a view of a typical magnetic hard disk file with the cover removed.

FIG. 3 shows a typical magnetic hard disk data storage device with the cover 8 removed. A series of disks 5 are clamped together in axially spaced relation for rotation in unison about a common axis and are mounted on a base plate 10. An actuator 12 carries a series of arms 13 that have secured thereto suspensions 14 that respectively carry transducers 15. Transducers 15 respectively confront disk surfaces 4 to write data to the disk or read data from the disk. The actuator arms 13 move in unison about a common axis to cause the transducers 15 to translate from one concentric recording track to another concentric track on the disk surface. The flat cable 16 contains the conductors that carry signals from the transducers 15 to the circuitry exterior of the head disk enclosure. In the assembled condition the cover 8 is sealed to base 10 by a gasket 17 and retained by a series of clips 18. The HDA is a substantially sealed enclosure surrounding the transducer heads and rotating data storage disks. A breather filter 20 is provided and positioned to access the enclosed atmosphere at a location of low pressure. This filter 20 is provided to compensate for atmospheric and thermally induced temperature changes. By being located at a low pressure location it is assured that any leakage location is at a higher pressure such that leakage is out of the enclosure and that makeup air is filtered. Thus, no unfiltered air enters the enclosure. To prevent contamination by vapors from outside the head-disk enclosure while the drive is not running, the breather filter is commonly provided with an extended length diffusion passage to prevent or limit the introduction of vapor contamination.

Figure 4:
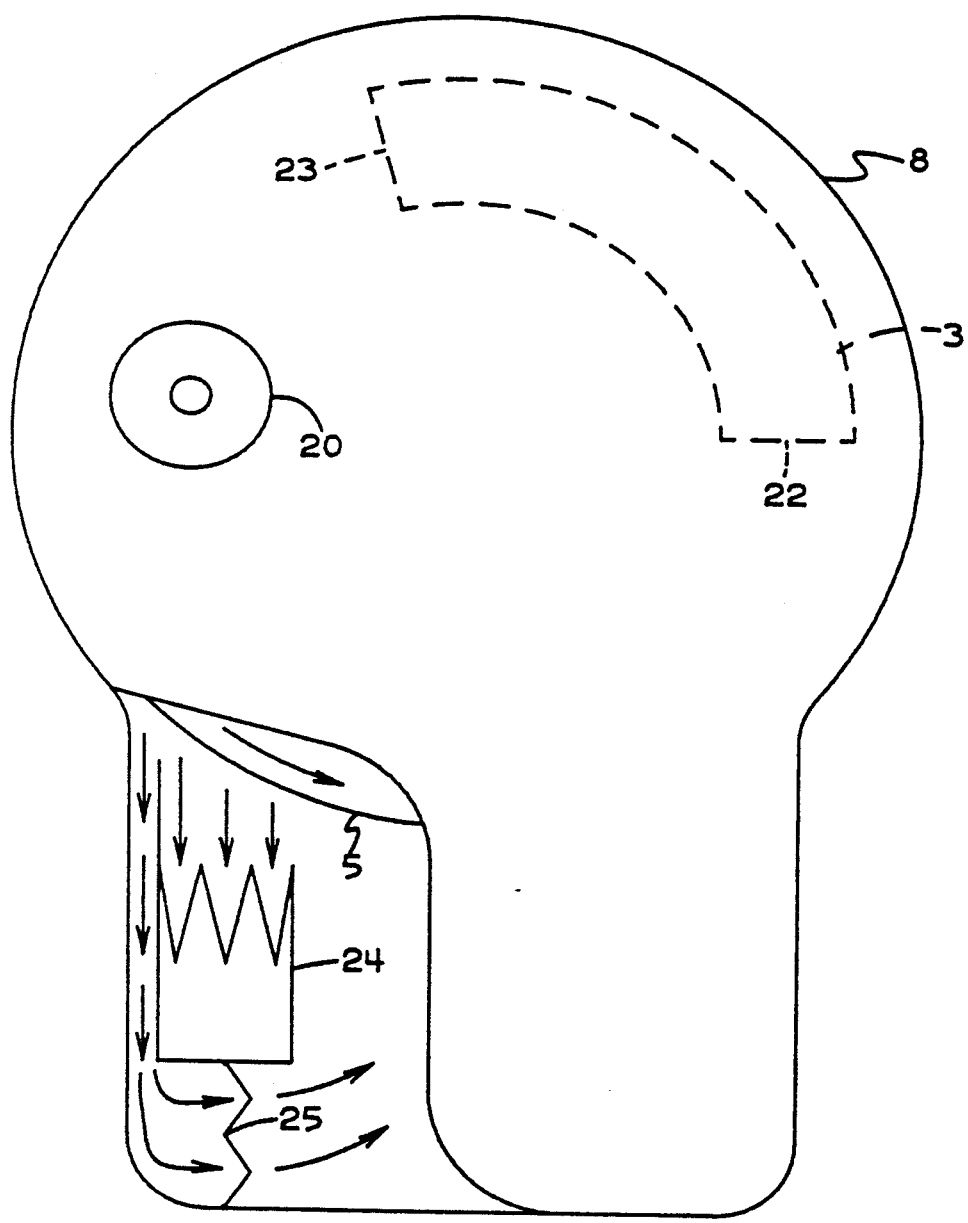
FIG. 4 is a plan view with the cover partly broken away of a disk drive such as shown in FIG. 3 which includes a steady state vapor transport system using a flow through vapor drain.

FIG. 4 shows a file, with the cover partially broken away, which includes a steady state lubricant vapor transport system. A reservoir 3 is secured to the inner surface of the cover 8, has an air entrance 22 and an exit opening 23 to permit an air flow induced by rotation of disk 5 to pass therethrough. Another flow of air induced by disk rotation is partitioned with one portion directed through the recirculating particulate filter 24 and another portion directed through the vapor drain 25.

Figure 5:
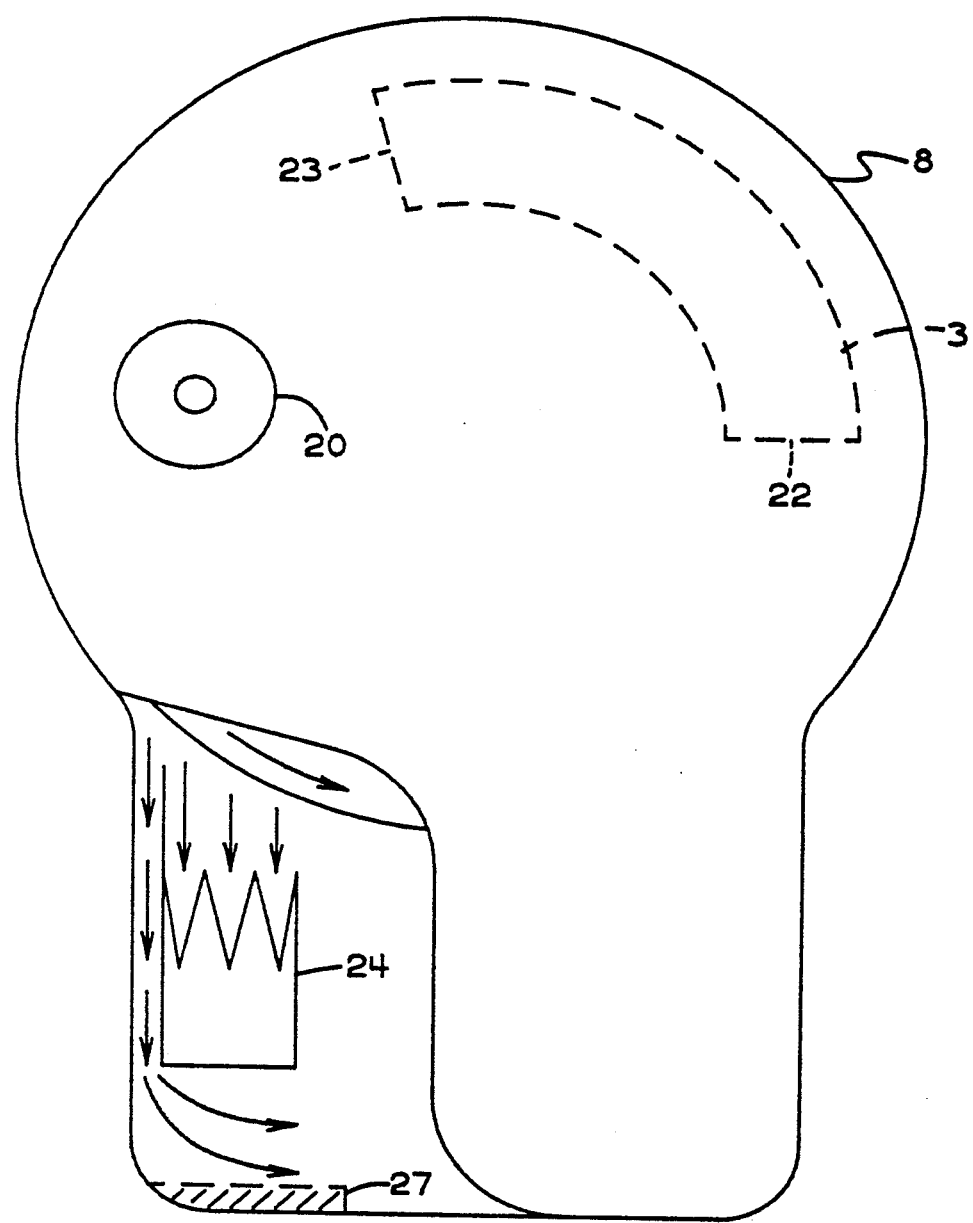
FIG. 5 is a plan view similar to FIG. 4 illustrating a steady state vapor transport system using a flow by vapor drain.

Another embodiment of a steady state system is shown in FIG. 5. This is similar to the system of FIG. 4 with the exception that the vapor drain is a flow by chemical filter for entrapping vapor by adsorption or absorption as the air flow within the enclosure is directed past the filter surface.

Figure 6:
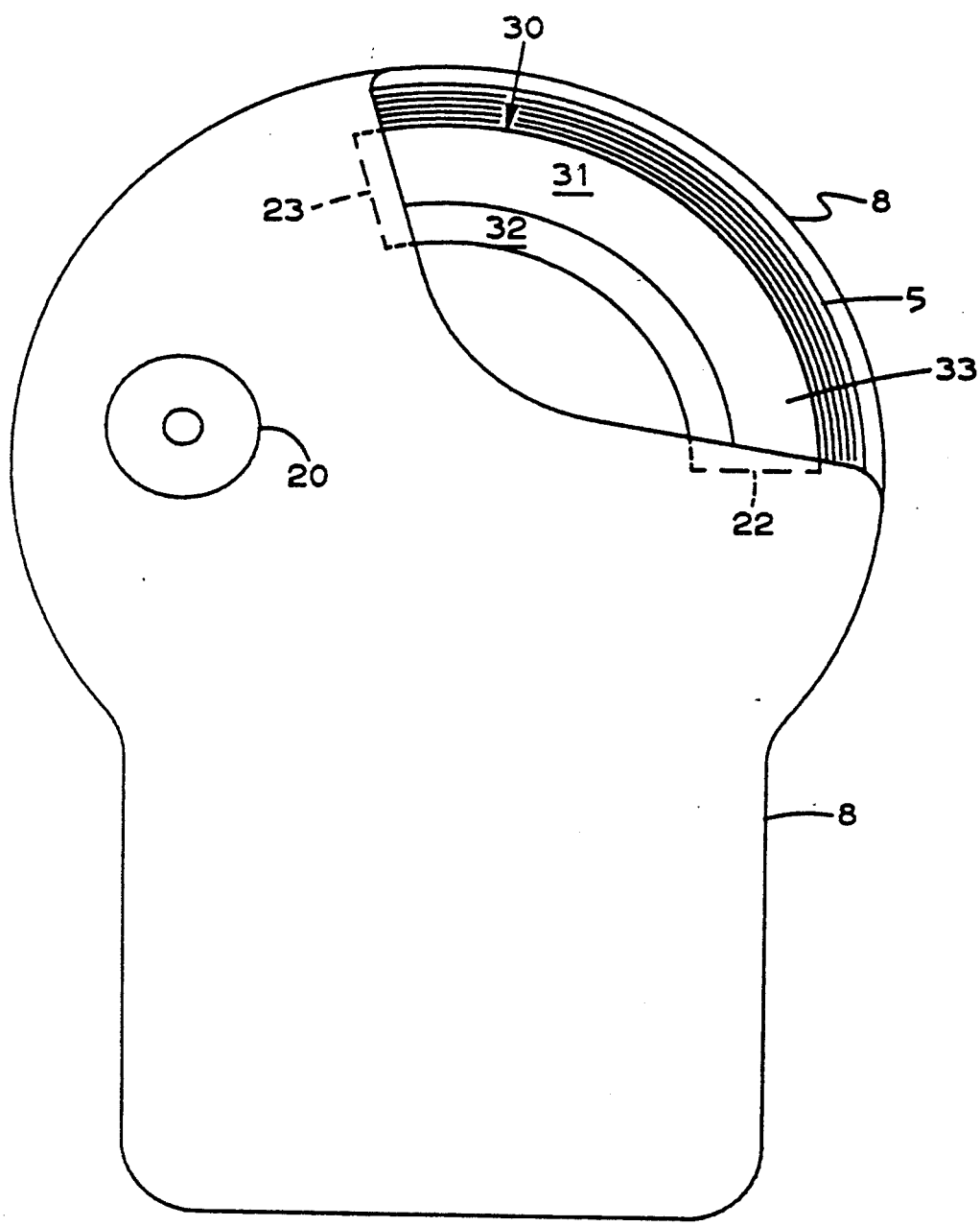
FIG. 6 is a plan view of a device similar to those of FIGS. 4 and 5 using a combined reservoir and vapor drain.
Figure 7:
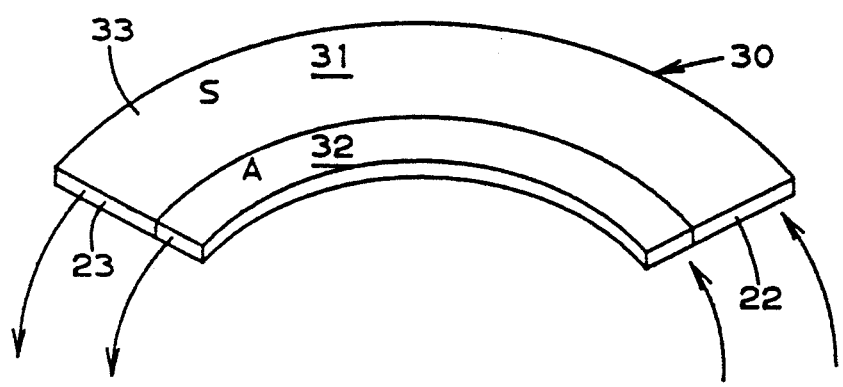
FIG. 7 illustrates the combined reservoir and vapor drain of FIG. 6.

FIG. 6 illustrates a further embodiment showing a disk drive with the cover 8 partially broken away wherein the lubricant reservoir and the vapor drain are formed as parallel arcuate paths in a single assembly. The reservoir-vapor drain assembly upper surface 33 is adhered to the cover inner surface in a position that is in the air flow induced by disk rotation. As shown in FIG. 7, the reservoir-vapor drain assembly includes one arcuate channel 31 that houses the lubricant source or reservoir and the other, adjoining arcuate channel 32 provides the vapor drain. The rotating disk 5 induces an air flow from the entry openings 22 to the outlet openings 23. Since both reservoir 31 and vapor drain 32 are in a common air flow path, the balance between lubricant vapor bearing air and vapor depleted filtered air is easier to achieve in addition to the recognized economy achieved by fabricating both functional elements as a single device.

Since the essence of the vapor drain is vapor control, the concept is also applicable to drives that do not use vapor transport lubrication systems. Disk surfaces having a nonselective affinity for organic vapors are subject to the accumulation of such contaminants which emanate from such sources as material outgassing and bearing lubricants. In particular, drives including disks with bonded lubricants are benefited by the vapor scavenging capabilities of a vapor drain. This contamination control function is useful regardless of the lubrication system, which might be a bonded lubricant, a single application liquid lubricant, vapor replenished lubricant, or other lubrication systems.

Figure 8:
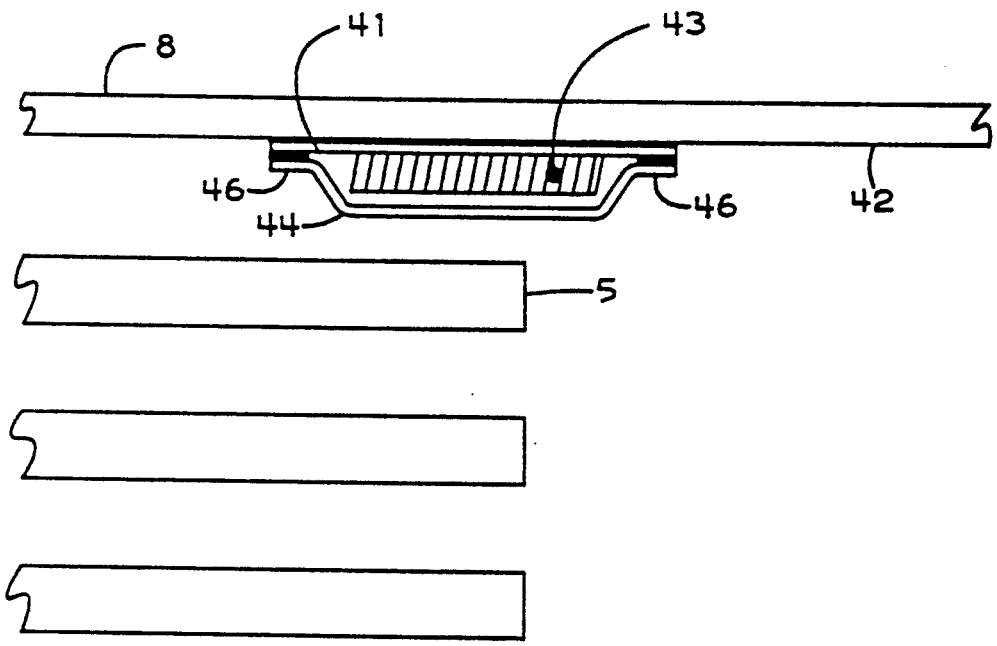
FIG. 8 illustrates a flow by vapor drain that can be attached to a disk drive cover to scavenge vapors from a head-disk enclosure.

FIG. 8 illustrates an embodiment wherein a vapor drain is used in the form of a flow-by chemical absorber or adsorber which is bonded to the cover 8 and positioned in the path of air circulation induced by rotation of the disks 5. The mylar or polycarbonate backing layer 41 is bonded to the cover 8 inner surface 42. An activated carbon chemical filter 43 is retained by a HEPA particulate media which is bonded to the backing along its margins 46 either by an adhesive or ultra sonic welding.

Another embodiment of a vapor drain used for contaminant entrapment is shown in FIG. 9. The vapor drain is placed in an opening 49 in the cover 8. The exterior is sealed by mylar tape 52 which is bonded to the exterior surface of cover 8 along the marginal edge surfaces of the opening 49. The activated carbon vapor drain element 51 is in the cover opening and retained by a HEPA particulate media 54 which is continuously bonded by adhesive about its margins 56 to the inner surface 42 of cover 8. In practice the vapor drain is fabricated as an assembly which is subsequently attached to the drive cover. If the mylar tape at the outer side of the vapor drain is removed, the activated carbon element 51 can be removed and even replaced without exposing the head-disk assembly within the enclosure to unfiltered air. This embodiment can be utilized either as a vapor drain for removing contaminants from the enclosure or as a sampling device which permits the filter to be removed so that entrapped contaminants can subsequently be analyzed.

The vapor drain has been shown in this description as a recirculating type chemical absorber or adsorber for entrapping chemical vapors. This is the preferred embodiment. The same result could be obtained by using a controlled leak that permits a predetermined rate of loss of vapor to the atmosphere outside the enclosure. In this application it would be likewise necessary to limit vapor depletion to a rate that would not cause the vapor from the lubricant reservoir to be exhausted during the useful life of the device. As with entrapment, lubricant vapor and contaminant vapors would be allowed to escape from the enclosure and be replaced by lubricant vapors from the reservoir.

The preceding vapor drain has been described in terms of a magnetic disk memory. Nevertheless it is more widely applicable. A vapor drain can control vapors in an optical memories use "near field optics", which has a head moving very close to a moving disk. Also vapor drain can control vapors inside a STM Scanning Tunneling Microscope, an AFM Atomic Force Microscope, and other techniques with a head moving ultra-close to an ultra-smooth surface. Furthermore a vapor drain is applicable to a memory device based on this STM microscope and these techniques.

In the claims which follow, we shall use "disk memories or similar devices" to mean any system where a head moves very close to a very smooth surface. This includes magnetic disk memories, optical memories with near-field optics, memories or microscopes based on STM or AFM or related techniques. Also the rotary disk geometry can be generalized to include a rectangular X-Y geometry, or a tape geometry. Thus this vapor drain invention is applicable to "a disk memory or similar device which is sensitive to vapors in its atmosphere".

While the invention has been particularly described with reference to preferred embodiments thereof, it will be understood by those skilled in the art that various changes in detail may be made therein without departing from the spirit and scope of the invention.

What is claimed is:

1. In a magnetic disk storage device wherein a layer of organic lubricant is maintained on the recording surface by vapor transport through the atmosphere within the disk enclosure using a controlled vapor pressure, said system comprising
    lubricant reservoir means which includes a lubricant supply, said lubricant reservoir means for releasing molecules to and receiving molecules from the atmosphere within said disk enclosure and
    vapor drain means, separate from said lubricant reservoir means, for effecting a controlled withdrawal of vapor from the atmosphere within said enclosure.

2. The system of claim 1 wherein said system further comprises means for causing a flow of said atmosphere within the disk enclosure and said vapor drain means comprises a filter through which a portion of said flow passes and which substantially irreversibly traps vapor from the atmosphere;
    said vapor drain mean withdrawing a predetermined portion of the lubricant from the atmosphere within the disk enclosure during the useful life of said disk storage device which is less that the lubricant supply of said reservoir during the useful life of said disk storage device.

3. The system of claim 2 wherein the active element of said filter comprises at least one of activated carbon, silica gel, activated alumina, synthetic zeolite, and other material with large surface to volume ratio with the ability to adsorb certain vapor components.

4. The system of claim 3 wherein said lubricant reservoir means and said vapor drain means are aerodynamically similar structures, such that regardless of the file operating state, the correct ratio of air flow through the two structures will be maintained.

5. The system of claim 4 wherein said lubricant reservoir means and said vapor drain means are integrated in a single unit.

6. The system of claim 3 wherein said lubricant reservoir means and said vapor drain means form portions of a single assembly having independent passageways disposed in parallel and said assembly is attached to a wall portion within said disk enclosure in the path of air flow induced by rotation of magnetic disks.

7. The system of claim 6 wherein said passageways are arcuate and coplanar.

8. A system for maintaining a controlled vapor pressure of a material in the atmosphere within an enclosure that surrounds a device and wherein molecules of said vapor are released to and received from said atmosphere, said system comprising a reservoir of said material that communicates with said atmosphere within said enclosure to release molecules to said atmosphere and receive molecules from said atmosphere, and a vapor drain means, separate from said reservoir, for effecting a controlled withdrawal of vapor from said atmosphere, said vapor drain means selected to present depletion of said material in said reservoir during a predetermined time period.

9. The system of claim 8 wherein the predetermined time is the useful life of said device.

10. The system of claim 9 wherein said system further comprises means for causing a flow of said atmosphere and said vapor drain means comprises a filter through which a portion of said flow passes and which substantially irreversibly traps vapor.

11. The system of claim 10 wherein the active element of said filter comprises at least one of activated charcoal, silica gel, activated alumina, synthetic zeolite and other material with large surface to volume ratio with the ability to adsorb some vapor molecules.

12. The system of claim 10 wherein the capacity of said filter is not sufficient to trap the quantity of material contained in said reservoir.

13. The system of claim 8 wherein said vapor drain means comprises means for limited loss of atmosphere out from said enclosure, and an inlet filter that admits an equal flow of atmosphere into said enclosure.

14. The system of claim 13 wherein said loss means comprises an orifice between the interior and exterior of said enclosure.

15. The system of claim 14 wherein said loss means further comprises passage means of substantial length extending between said orifice and one of the interior and the exterior of said enclosure.

16. The system of claim 13 wherein said loss means comprises extended passage means for interconnecting said atmosphere within said enclosure and the ambient atmosphere exterior of said enclosure.

* * * * *